(No Model.)
C. M. ALEXANDER.
CUFF HOLDER.
No. 295,091. Patented Mar. 11, 1884.
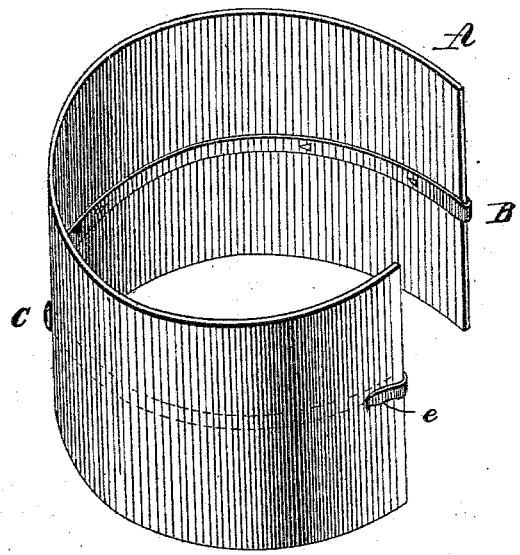
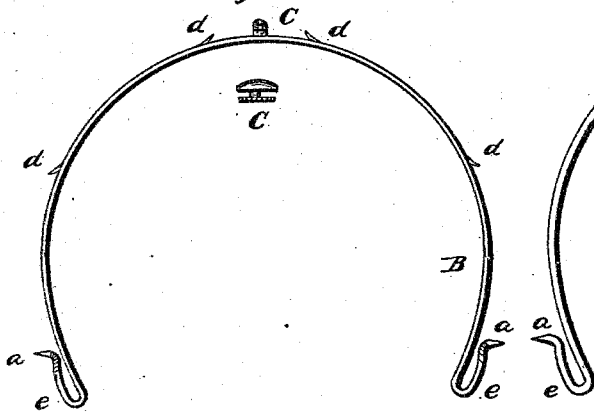
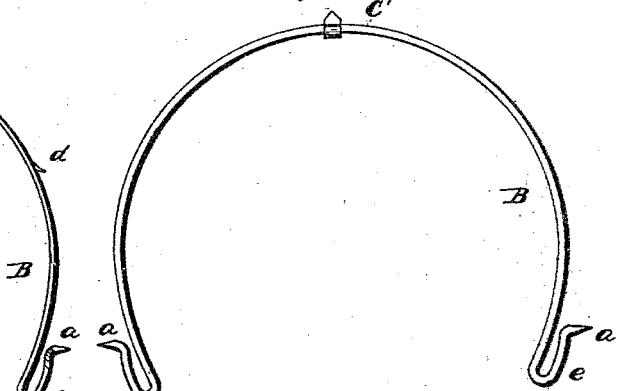
WITNESSES
INVENTOR
C. Madison Alexander.

UNITED STATES PATENT OFFICE.

C. MADISON ALEXANDER, OF BRIGHTWOOD, DISTRICT OF COLUMBIA.

CUFF-HOLDER.

SPECIFICATION forming part of Letters Patent No. 295,091, dated March 11, 1884.

Application filed August 9, 1883. (No model.)

*To all whom it may concern:*

Be it known that I, C. MADISON ALEXANDER, a citizen of the United States, residing at Brightwood, in the District of Columbia, have invented certain new and useful Improvements in Cuff-Holders, of which the following is a specification, reference being had therein to the accompanying drawings.

The object of this invention is to provide an appliance to be attached to a cuff, so that when said cuff is placed in the sleeve of a coat it will not only distend the sleeve, but remain wherever placed, showing just so much of the cuff as may please the wearer, and also to keep the cuff away from the wrist of the wearer, so that it will hold its starch for a greater length of time, and will not be liable to become so readily soiled as heretofore. I accomplish this by means of a spring, which is secured to the cuff either upon its inside or outside, its two ends not being connected together, but left free to accommodate the cuff to the size of the sleeve in which it is to be placed.

In the accompanying drawings, making a part of this specification, Figure 1 represents a perspective view of a cuff with a flat spring secured to its inner surface, and Figs. 2 and 3 are plan views of differently-constructed springs detached from the cuff.

In the figures, A represents a cuff of any ordinary construction, preferably with an eyelet-hole at its center. B represents a spring, preferably of metal, and plated or otherwise coated to prevent oxidation. This spring may be made either round or flat. When made flat, small points *d d* may be punched or formed in it, so that it will keep its place against the cuff and be prevented from slipping. The ends of the spring are bent outward, if the spring is to be secured on the inside of the cuff, as indicated by the letter C, so as to embrace the edges of the cuff, as indicated in Fig. 1 of the drawings, the extremities of said bent portions being bent outward at an angle, and pointed, so as to fasten the cuff within the sleeve of the coat, to prevent slipping. Midway between the two ends of the spring may be secured a swiveled button having an oblong head, which may be passed through a button-hole formed in the cuff, and then turned at right angles thereto, so as to securely fasten it to the same; or this object may be accomplished by means of a clip or projection, C', which may be pointed, so as to hold it in the coat-sleeve, in addition.

The operation of my device will be evident, and is as follows: Being secured to the cuff, as shown, the cuff is bent as shown in Fig. 1, passed over the hand and wrist, and then allowed to spring so as to spread out in the sleeve, when it will become securely fastened in any desired position.

Having thus described my invention, what I claim, and desire to secure by Letters Patent, is—

1. An appliance to be attached to a cuff, consisting of a spring adapted to be secured to it, so as to distend the same, and provided with means for holding it in a coat-sleeve, all substantially as specified.

2. An appliance adapted to be attached to a cuff, consisting of a spring having its ends bent, as described, to embrace the edges of the cuff, and provided with points at suitable intervals to hold it to the cuff, substantially as set forth.

3. An appliance adapted to be attached to a cuff, consisting of a spring having the ends bent and pointed, so as to hold the cuff within the sleeve, substantially as specified.

4. An appliance adapted to be attached to a cuff, consisting of a spring having its ends bent, as described, and provided with a button or projection midway between its ends, substantially as specified.

In testimony whereof I affix my signature in presence of two witnesses.

C. M. ALEXANDER.

Witnesses:
J. J. McCARTHY,
H. J. ENNIS.